(12) United States Patent
Manders et al.

(10) Patent No.: US 7,555,554 B2
(45) Date of Patent: Jun. 30, 2009

(54) SYSTEM AND METHOD FOR GENERATING SELECTABLE EXTENSION TO MEDIA TRANSPORT PROTOCOL

(75) Inventors: Blake D. Manders, Kirkland, WA (US); Oren Rosenbloom, Redmond, WA (US); Vladimir Sadovsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 793 days.

(21) Appl. No.: 10/912,096

(22) Filed: Aug. 6, 2004

(65) Prior Publication Data

US 2006/0031545 A1 Feb. 9, 2006

(51) Int. Cl.
*G06F 15/16* (2006.01)

(52) U.S. Cl. .............. 709/227; 709/223; 709/217; 709/203

(58) Field of Classification Search .......... 709/227, 709/223, 224, 217, 219, 203
See application file for complete search history.

(56) References Cited

U.S. PATENT DOCUMENTS

| | | | |
|---|---|---|---|
| 5,887,193 A | 3/1999 | Takahashi et al. |
| 6,133,908 A | 10/2000 | Scibora et al. |
| 6,181,342 B1 | 1/2001 | Niblack |
| 6,370,543 B2 | 4/2002 | Hoffert et al. |
| 6,922,813 B1 | 7/2005 | Korenshtein |
| 7,194,701 B2 | 3/2007 | Stavely et al. |

(Continued)

FOREIGN PATENT DOCUMENTS

CN 1288195 A 3/2001

(Continued)

OTHER PUBLICATIONS

Satran K. Meth, "Internet Small Computer Systems Interface", Apr. 2004, p. 183-p. 205, European Patent Office.

(Continued)

*Primary Examiner*—Lashonda T Jacobs
(74) *Attorney, Agent, or Firm*—Shook, Hardy & Bacon L.L.P (57) ABSTRACT

A protocol and related techniques and platforms allow vendors to selectably extend the Media Transport Protocol (MTP), or other defined protocols to implement vendor-specific commands, data fields, instructions and other extension sets. According to embodiments of the invention in one regard, one or more extension space may be utilized to derive independent extension sets, in part by separating the extension space according to a unique identifier assigned to or associated with a given vendor. In embodiments that unique identifier may be or include an Internet DNS (Domain Name System) domain name, or other extension set name or identifier. According to the invention in one regard, because a DNS domain name may be independently registered and secured by participating vendors or manufacturers and by definition uniquely assigned, the separation of vendor extension sets by that type of name may be automatic and free from conflict. Vendors or manufacturers, such as makers of digital cameras, digital video cameras, audio players such as MP3 or other players, software vendors or others may therefore freely design extensions to the Media Transport Protocol or other protocols, without a need to clear those extensions with a standards body and with confidence that their commands, data fields and other extensions may be free from overlap with that of other manufacturers.

43 Claims, 4 Drawing Sheets

U.S. PATENT DOCUMENTS

| | | | |
|---|---|---|---|
| 7,206,853 | B2 | 4/2007 | Eytchison et al. |
| 7,231,456 | B1 * | 6/2007 | Chiba et al. .................. 709/236 |
| 7,246,179 | B2 * | 7/2007 | Camara et al. .................. 710/5 |
| 7,376,333 | B2 | 5/2008 | Chung et al. |
| 2001/0014891 | A1 | 8/2001 | Hoffert et al. |
| 2001/0042107 | A1 | 11/2001 | Palm |
| 2002/0112226 | A1 | 8/2002 | Brodersen et al. |
| 2003/0014415 | A1 | 1/2003 | Weiss et al. |
| 2003/0046437 | A1 | 3/2003 | Eytchison et al. |
| 2003/0110369 | A1 * | 6/2003 | Fish et al. ...................... 713/1 |
| 2003/0110514 | A1 | 6/2003 | West et al. |
| 2003/0135661 | A1 | 7/2003 | Barker et al. |
| 2004/0125756 | A1 | 7/2004 | Lepore et al. |
| 2004/0205286 | A1 | 10/2004 | Bryant et al. |
| 2004/0254014 | A1 * | 12/2004 | Quraishi et al. ............... 463/29 |
| 2005/0278442 | A1 | 12/2005 | Motoyama et al. |
| 2006/0026167 | A1 * | 2/2006 | Pasumansky et al. ......... 707/10 |
| 2006/0036750 | A1 * | 2/2006 | Ladd et al. .................. 709/229 |
| 2006/0129938 | A1 | 6/2006 | Humpleman et al. |

FOREIGN PATENT DOCUMENTS

| | | | |
|---|---|---|---|
| EP | 0637157 | A2 | 2/1995 |
| EP | 1081897 | B1 | 3/2001 |
| EP | 1085433 | A2 | 3/2001 |
| EP | 1199874 | | 4/2002 |
| EP | 1429532 | | 6/2004 |
| WO | 9859282 | A2 | 12/1998 |
| WO | 9907111 | A1 | 2/1999 |
| WO | 2005111869 | A2 | 11/2005 |

OTHER PUBLICATIONS

Erik Guttman, "Vendor Extensions ofr Service Location Protocol, Version 2", Oct. 6, 2001, p. 1-p. 7, European Patent Office.

Simpson, "PPP Vendor Extensions", May 1997, pp. 1-p. 5, European Patent Office.

Scott O. Bradner, "Considerations on the Extensibility of IETF Protocols" Jun. 4, 2004, p. 1-p. 10, European Patent Office.

Microsoft Corporation, Apr. 24, 2002, Paragraph 0025-Paragraph 0065, European Patent Office.

Blacke Manders; Oren Rosebloom, "Media Transfer Protocol" May 17, 2004, pp. 1-36, URL:http://www.microsoft.com.

Peter M. Corcoran, "Mapping Home-Network Applicances to TCP/IP Sockets Using a Three-Tiered Home Gateway Architecture," vol. 44, No. 3, Aug. 1998, IEEE Transactions, 8 pp.

EPC Search Report, EPO 0 40 10221, Jul. 15, 2005, Microsoft Corporation, 5 pp.

EPC Search Report, EPO 0 50 14693, Nov. 24, 2005, Microsoft Corporation, 10 pp.

Gregory N. Hullender, "An Efficient Method for Tuning Handwriting Parameters," Microsoft Corporation, Redmond, WA, Dec. 2005, 4 pp.

International Search Report, dated Mar. 15, 2006, for corresponding PCT Application No. PCT/US04/24962, 1 p.

* cited by examiner

FIG. 1

| | | | | | | | | | | |
|---|---|---|---|---|---|---|---|---|---|---|
| ⋮ 110 | | | | | | | | | | |
| EXTENSION SPACE 1 | EXTENSION SET NAME 1 | VERSION ID 1 | | | | | | | | |
| | EXTENSION SET NAME 2 | VERSION ID 2 | | | | | | | | |
| | ⋮ | ⋮ | | | | | | | | |
| | EXTENSION SET NAME X | VERSION ID X | | | | | | | | |
| EXTENSION SPACE 2 | EXTENSION SET NAME 1 | VERSION ID 1 | | | | | | | | |
| | EXTENSION SET NAME 2 | VERSION ID 2 | | | | | | | | |
| | ⋮ | ⋮ | | | | | | | | |
| | EXTENSION SET NAME Y | VERSION ID Y | | | | | | | | |
| ⋯ | | | | | | | | | | |
| EXTENSION SPACE N | EXTENSION SET NAME 1 | VERSION ID 1 | | | | | | | | |
| | EXTENSION SET NAME 2 | VERSION ID 2 | | | | | | | | |
| | ⋮ | ⋮ | | | | | | | | |
| | EXTENSION SET NAME Z | VERSION ID Z | | | | | | | | |
| DEFINED SCHEMA... 112 | 114 | 116 | 118 | | | | | | | |

SYSTEM AND METHOD FOR GENERATING SELECTABLE EXTENSION TO MEDIA TRANSPORT PROTOCOL

CROSS-REFERENCE TO RELATED APPLICATIONS

The subject matter of this application is related to the subject matter of co-pending U.S. patent application Ser. No. 10/429,116 filed May 2, 2003 entitled "System and Method for Facilitating Communication Between a Computing Device and Multiple Categories of Media Devices"; and to the subject matter of co-pending U.S. patent application Ser. No. 10/836,261 filed May 3, 2004 entitled "System and Method for Encapsulation of Representative Sample of Media Object", each of which applications is assigned or under obligation of assignment to the same entity as this application, and each of which applications is incorporated by reference herein.

STATEMENT REGARDING FEDERALLY SPONSORED RESEARCH OR DEVELOPMENT

Not applicable.

FIELD OF THE INVENTION

The invention relates to the design of computer protocols, and more particularly to a protocol, supporting hardware and techniques which permit hardware vendors to define individual extensions to a media transport protocol, to enable advanced or specific functions for specific hardware or applications.

BACKGROUND OF THE INVENTION

The need for a standardized protocol for communication with media devices has been addressed with the development of the Media Transfer Protocol (MTP), an advanced, publicly defined protocol which may be used to link to MP3 players, video playback and other media devices to personal computers or other clients. As with other protocols designed for other purposes, the Media Transfer Protocol defines a set of commands, data structures and other standardized schema which permit devices to talk to each other compatibly and reliably, even if the devices are made by different manufacturers or have never communicated before. In the case of MTP, the native commands and data structures of that protocol may facilitate, for example, the object-oriented retrieval and management of media files, such as MP3 or other audio files, Windows™ Media video files, or other files or formats. Device manufacturers, software developers and others may incorporate such transport or other protocols to leverage advantages of lower cost and greater compatibility in their products. However, establishing a precisely defined standard can also entail certain disadvantages as well.

Among those disadvantages is the lack of a ready way to enable vendor-specific extensions to the protocol. Protocol extensibility has been implemented in a fashion in the past, for instance to permit vendors to specify vendor-specific fields or modes appended to the normal data structures of the protocol. However, even when those limited protocol extensions have been possible, they have in general been generated by way of a standards body distributing approval for those extensions and defining them for members upon request. For instance, extensions to the Picture Transfer Protocol (PTP) used in digital cameras and other products have been possible only through human-reviewed designation by the Photographic and Imaging Manufacturers Association (PIMA), now inactive. Delegating the task of assigning extensions to a third party body has the advantage that definitions may be defined in a mutually exclusive way, so that the commands or other extensions of one manufacturer may be ensured to not interfere with that of another manufacturer. For example, address spaces or command definitions may be divided so that operations do not conflict. However, the mechanism of human-reviewed standards approval may often be a cumbersome process, so that individual vendors may not be able to quickly implement or reliably verify protocol extensions for their hardware, software or other purposes. Other problems in the technology and process of protocol design exist.

SUMMARY OF THE INVENTION

The invention overcoming these and other problems in the art relates in one regard to a system and method for generating a selectable extension to a protocol, such as the Media Transport Protocol or other protocols, layers or schemas, in which among other things a unique identifier may be used to automatically discriminate independent extension sets implemented by individual vendors. In embodiments of the invention in one regard, one or more extension space may be appended to the data structure of the baseline protocol, whether MTP or other. Each extension space, for instance each owned by or assigned to a company, vendor or other organization, may in turn permit a set of vendor-defined protocol extension sets, which may include additional or specialized commands, data fields or other data structures or extensions to be implemented in that space. The vendor-defined extension sets may in one regard be identified or specified using a unique identifier specific to individual vendors reserving extensions in that space. That identifier in embodiments may be or include the Domain Name System (DNS) Internet domain name registered or assigned to that vendor. Each unique extension set name, along with version identifiers or other fields, may in turn specify an extension set though which devices, such as digital cameras, personal digital assistants, cellular telephones, audio, video or other players or devices, may communicate and be manipulated, for instance via a client computer. In embodiments the extension sets defined by vendors or manufacturers may be accessed or downloaded from a remote data store, such as a database server on the Internet. Because in one regard the extension sets identified by the extension set names are guaranteed to be uniquely associated with one vendor, group or other entity, and that unique assignment may be made without a reliance on or necessity for intervention by a third party standards body or other human-reviewed organization, vendors may be free to directly pursue the development of protocol extensions customized for their hardware, software or other products. That design effort may therefore be made in a prompt manner and with assurance that a vendor's extension sets will be independent from, and not conflict with, extension sets implemented by other vendors.

BRIEF DESCRIPTION OF THE DRAWINGS

FIG. 2 schematically illustrates a protocol, such as a media transport or other protocol, which may be illustratively extended according to embodiments of the invention.

DETAILED DESCRIPTION OF EMBODIMENTS

Figure 1:
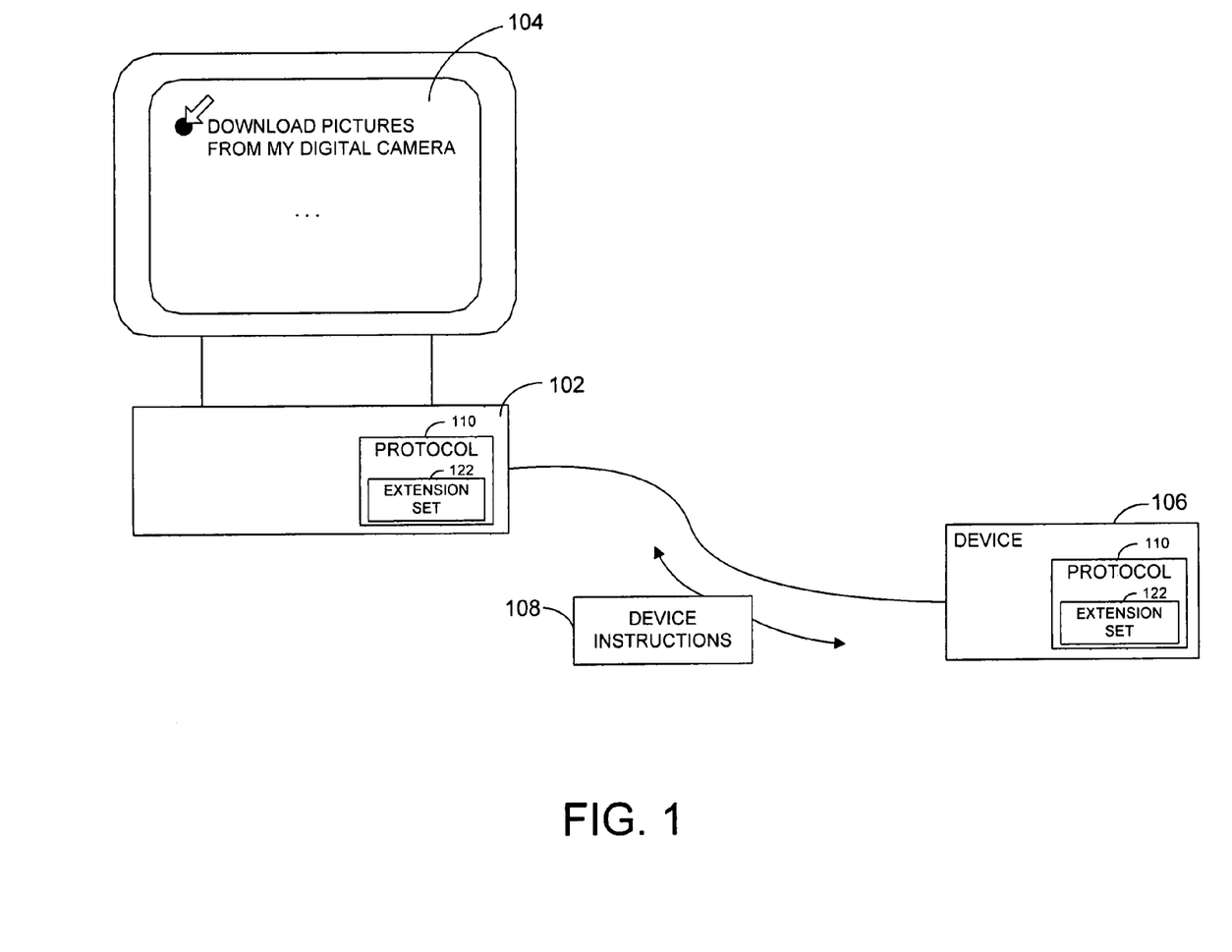
FIG. 1 illustrates an environment in which a system and method for generating selectable extensions to the Media Transport Protocol or other protocol may operate, according to embodiments of the invention.

FIG. 1 illustrates an environment in which a system and method for generating selectable extensions to a protocol, such as the Media Transport Protocol or other protocols, layers or schema may operate, according to embodiments of the invention. As illustrated in that figure a client 102, such as a personal computer, portable computer or other computer or machine may communicate with a device 106 to initiate and perform operations such as file uploads or downloads, playing or recording audio, video, photographic or other media or content, updating software or firmware, formatting hard disks or other storage, or in general perform other processing or tasks. The device 106 may in one regard be or include, for instance, a digital audio player such as an MP3 (Motion Pictures Experts Group, Audio Layer 3) or other audio player, an audio recorder, a video player such as a DVD or other player, a digital camera generating JPG (joint photographic experts group) or other files, a video recorder such as a digital video recorder, a communications device such as a cellular telephone, a personal digital assistant, a network-enabled wireless device such as a wireless email or other messaging device, a global positioning system (GPS) or other positioning device, an event recording device, a remotely controlled device, a telemetry device, an instrumentation device, an industrial device, a medical device, a portable storage device, or other device, player or system. Device 106 may in general include or incorporate programmable or other logic or control, including for instance processor, software, firmware and other resources. In embodiments, the client 102 and device 106 may communicate via wired connections such as a FireWire™ (IEEE 1392) or Universal Serial Bus (USB) connection, or via wireless connections such as a BlueTooth™ or WiFi™ connection, or other channels or connections.

According to embodiments of the invention in one regard, the device 106 and client 102 may be configured to communicate via a protocol 110, such as the Media Transport Protocol (MTP), or other media-enabled or other protocols, layers or schema. The Media Transport Protocol for its part includes in one regard a set of driver standards, commands, application programming interfaces, communication protocols and other resources for instance published by Microsoft Corp. and, in general, directed to promoting the reliable and efficient exchange of media content between clients, devices, applications and storage media. The Media Transport Protocol is for instance further described, and may be implemented or deployed in manners discussed, in the aforementioned co-pending U.S. patent application Ser. No. 10/429,116. However, while description is made of media manipulation using the Media Transport Protocol, it will be appreciated that according to embodiments of the invention in a further regard, other protocols, layers or schema may be used as or incorporated within protocol 110.

According to embodiments of the invention, a user may operate a user interface 104 on client 102 to access files, play media, format storage and perform other tasks in conjunction with the device 106. For example the user interface 104 may be, include or interface to a media player, such as the Windows™ Media Player or others. When communicating with the device 106 using the Media Transport Protocol or other defined protocol 110, the client 102 and device 106 may invoke various operations and commands defined and structured in that protocol, for instance to retrieve media objects, play or store content such as music or audio files, digital photographs or digital video, or execute other functions. Examples of such manipulation of media objects and other content using the Media Transport Protocol are, for instance, described in the aforementioned co-pending U.S. patent application Ser. No. 10/836,261.

However, in instances it may be the case that the manufacturer, vendor, software developer or other entity selling or supporting the device 106 may wish to extend the set of baseline operations available in the operative protocol 110 to manipulate the device 106, for instance to take advantage of particular hardware features or software programming of that device. In general, neither the Media Transport Protocol nor other protocols are natively designed permit a manufacturer or other to freely design and deploy additional commands, data fields, operations or other extensions to the base protocol, without invoking a manual, external or human-reviewed process to establish those extension sets. However, according to embodiments of the invention in one regard, extensions to the Media Transport Protocol or other protocols may be freely implemented and deployed, without requiring a human-review process yet still ensuring that extension sets developed by diverse manufacturers, developers or other vendors may operate without conflict within the defined protocol 110.

According to embodiments of the invention, and toward those purposes in one regard, a structured allocation or division of the available extension space may be generated or defined within the existing Media Transport Protocol, or other protocol. That is, according to the invention device 106 and client 102 or other initiators, responders or other communicating entities to access commands, operations and other extensions defined as extension sets in those structured allocations, which may be mutually exclusive to other vendors, developers and their corresponding extension sets. In operation and as illustrated in FIG. 1, therefore, client 102 and device 106 may establish communication using the Media Transport Protocol or other protocol 110, and access and transmit a further set of device instructions 108 based on that device's identified extension set 122 understood by both sides, for instance utilizing device instructions 108 to drive device 106 into special modes of operation, or otherwise.

More particularly, and as illustrated in FIG. 2, the client 102 and device 106 may communicate via protocol 110, such as the Media Transport Protocol, or other protocols, layers or schema. Protocol 110 may include a set of defined schema 112, such as a collection of commands, instructions, data fields, headers, flags, signaling standards or other resources and definitions to support operations including, for example, the transport, playing or storage of media objects or other files or data. Protocol 110 may further include, as illustrated, a set of extension spaces 114, which in the case of the Media Transport Protocol may for example be or include a set of defined address or command ranges or spaces allocated, restricted or set aside for certain purposes or entities, by definition. Each allocated extension space in the set of extension spaces 114 may, in turn, be further allocated or divided according to further identifiers and fields, to permit the exclusive definition of an extension set 122 associated with device 106 and/or its associated manufacturer, vendor, software developer, support or other entity.

More particularly as illustrated in FIG. 2, each extension space may have associated with a set of extension set names 116, which extension set names act as a unique identifier to a corresponding extension set 122 containing customized, specialized or other extensions or additions to the protocol 110. According to embodiments of the invention in one regard, the set of extension set names 116 may be or include a manufacturer, software developer or other vendor's registered domain name in the Internet Domain Name System (DNS), in the form, for example, of "Microsoft.com" or otherwise. That is, DNS domain name associated with or owned by a manufacturer, software developer or other vendor or entity may serve in context of protocol 110 to uniquely encode an identify of that vendor or entity, which unique identifier may then be used as a key field to specify one or more extension set 122 produced, deployed or supported by that entity. Because DNS domain names can only be registered to, associated with or owned by one entity (or affiliates) at a time as administered by ICANN (Internet Corporation for Assigned Names and Numbers), that identifier may therefore ensure that the corresponding extension set 122 pointed to by that identifier in the set of extension set names 116 can only be accessed, initiated or processed by a device 106 conforming to that entity's design. An extension set name may, for instance, be stored in firmware in device 106 or otherwise, for identification of extensions available to or compatible with that device.

According to embodiments of the invention in another regard, the code, instructions, commands, data fields and other extensions or structures defined in extension set 122 may access or initiate specialized or other commands or operations, for instance those tailored to the hardware, software or firmware of device 106 based or keyed on that unique DNS or other identifier. Thus extension set 122 may include commands to permit a digital video recorder, for example, as device 106 to enter different recording modes, such as NTSC, PAL, HDTV or other formats, modes or resolutions. Similarly, if device 106 is a digital audio playback device, extension set 122 may initiate or access playback modes supported by that device, such as an audio codec at special resolutions. Other commands, instructions, data or fields are possible.

In terms of extension set 122 and its further definition or specification, in embodiments, and as likewise illustrated in FIG. 2, each extension set name in the set of extension set names 116 may likewise have associated with it a version ID field 118, for example to specify which version of an extension set 122 may be employed with device 106, when more than one version of that extension set 122 is available. For instance, different versions of extension set 122 may be available for different operating systems, or different versions of extension set 122 may be deployed over time as development on that extension set continues, to address bugs, incorporate new hardware, or for other reasons. It may be noted that according to embodiments of the invention in one regard, the version ID field 118 for a given extension set 122 may store or encode multiple version identifiers, such as "2.0; 2.1; 2.2; 3.0" or other expressions, to indicate that device 106 is compatible with, or may be operated by, more than one version of extension set 122, together or separately.

When a device 106 and client 102 have communicated, and a unique identifier in the set of extension set names 116 associated with the device has been identified or validated, the client 102 and/or device 106 may then access the corresponding extension set 122 to communicate device instructions 108 to the device. Client 102 may communicate with the device 106 via an application such as one supplied by the manufacturer of device 106 or otherwise, through operating system operations or other control modules or logic using protocol 110 and identified extension set 122. In embodiments, the extension set 122 itself may, for instance, be stored or encoded in client 102, for example in the form of an operating system resource, driver store or otherwise. In embodiments, the client 102 may need to access a stored image or copy of extension set 116, in order to communicate with device 106 using the subject commands, instructions, data fields or other extensions.

Figure 3:
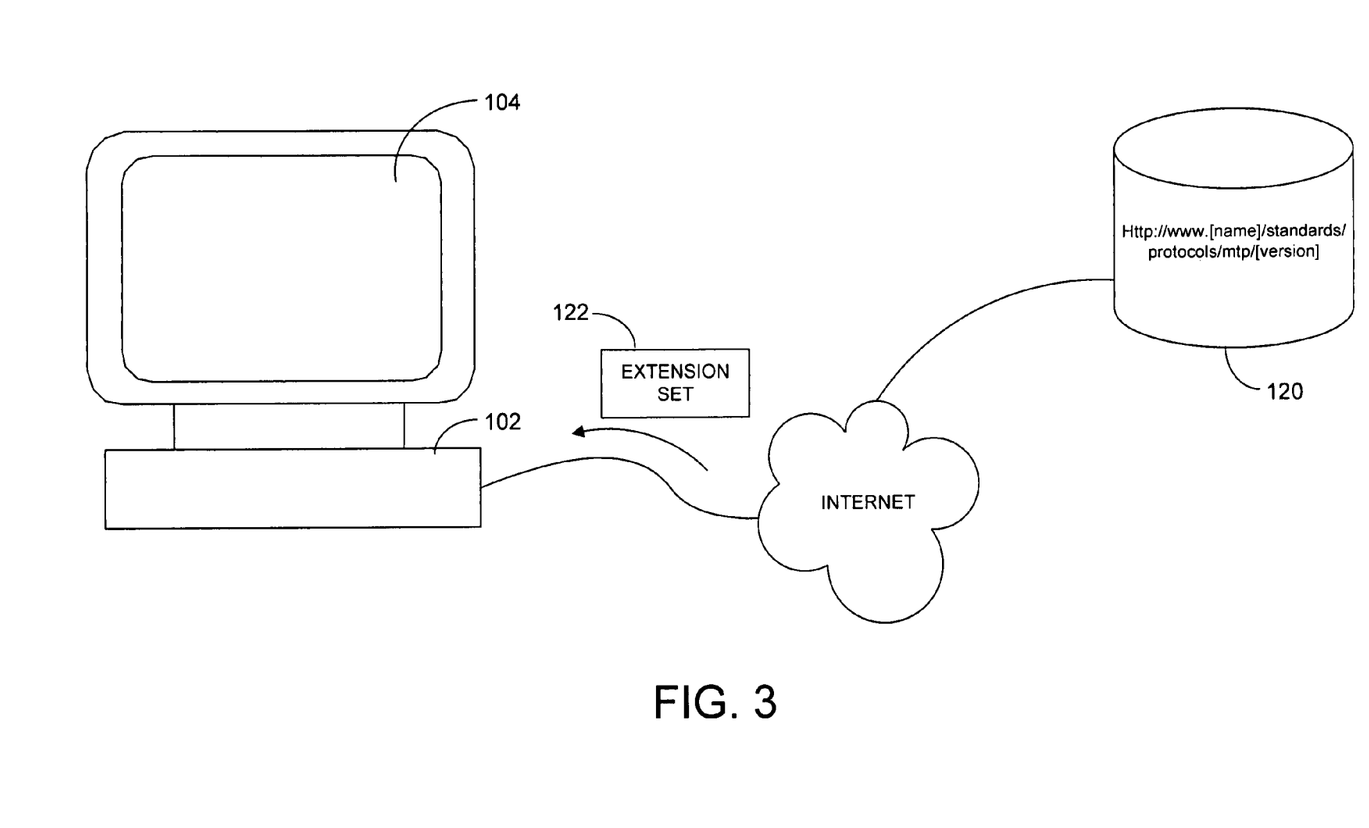
FIG. 3 illustrates retrieval of an extension set via a remote data store, according to embodiments of the invention.

In embodiments such as for example illustrated in FIG. 3, the extension set 122 may be stored by, and accessible via, a remote extension set data store 120, such as a database server accessible via the Internet. In cases where client 102 does not locally host the appropriate extension set 122 detected for device 106, the client 102 may therefore initiate an Internet or other network download of an image or copy of extension set 122, as shown. Other storage locations and configurations for extension set 122 are possible. For example, each copy or image of protocol 110 may embed a partial or whole copy of each extension set 122 associated with the set of extension set names 116 when initially installed on client 102, depending on storage and other considerations.

Figure 4:
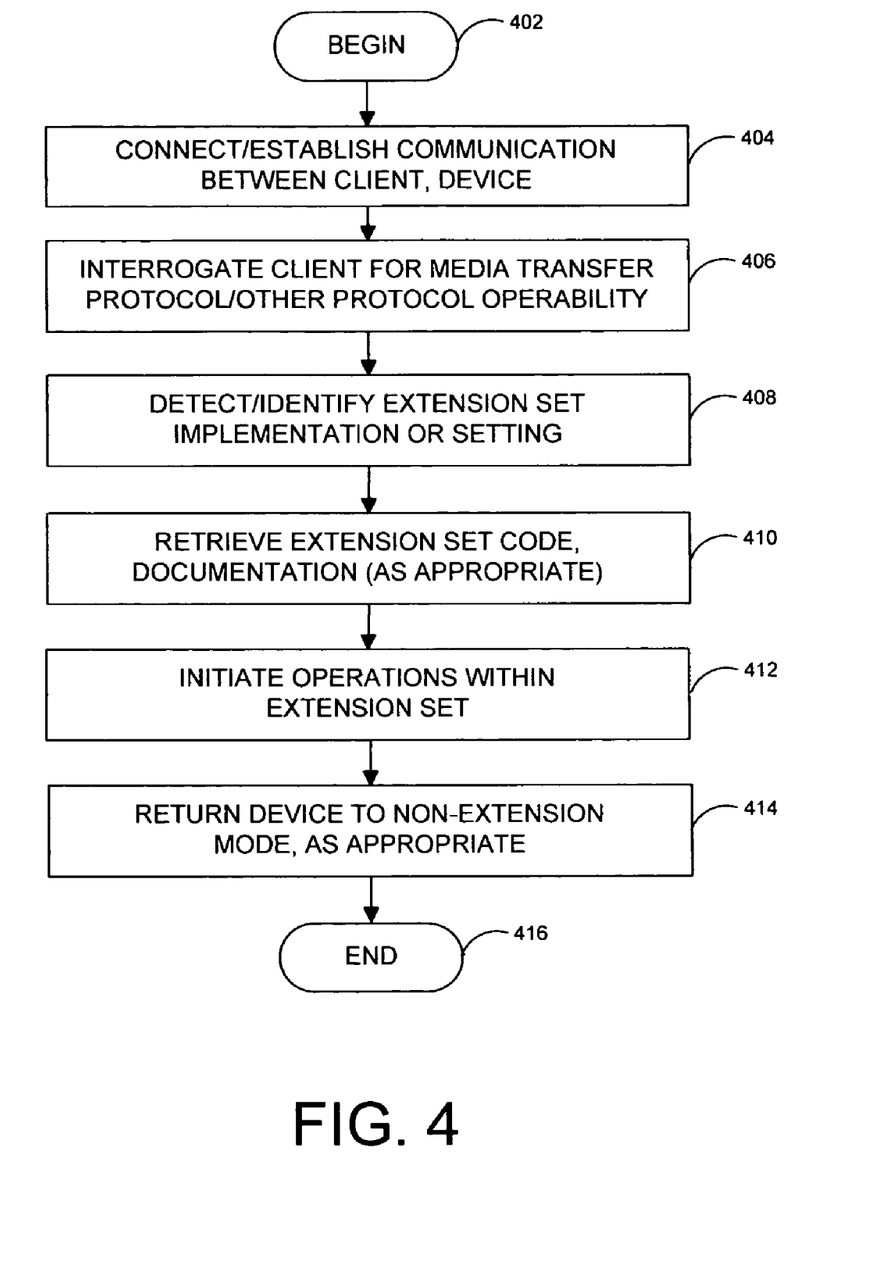
FIG. 4 illustrates a flowchart of overall protocol extension processing, according to embodiments of the invention.

FIG. 4 illustrates overall protocol extension processing, according to embodiments of the invention. In step 402, processing may begin. In step 404, client 102 and device 106 may establish a connection, as for instance between a personal computer or other client and an audio player, video player or video recorder, cellular telephone, or other media, communications or other device. In step 406, the client 102 may be interrogated or checked for operability with the Media Transport Protocol or other protocol 110, for instance by a query from device 106 or otherwise. In step 408, an extension set implementation or setting for device 106 may be detected, for instance by detecting a valid extension set name in the set of extension set names 116, for instance a valid Domain Name System (DNS) Internet domain name or other unique identifier or code. In embodiments, the extension set name or other identifier may identify a particular vendor or manufacturer, for instance the manufacturer of device 106, software controlling or operating on device 106, or other hardware, software or other resources.

In step 410, the extension set 122 which may include one or more set of device instructions 108 may be accessed or retrieved, for instance by client 102 or by device 106 itself. In embodiments the extension set 122 may be accessed from local storage such as a hard disk or other storage, or retrieved form a remote sources, such as for example extension set data store 120 or other sources. In step 412, special, customized or other operations within the extension set 122 may be initiated between client 102 and device 106, for example to set the sampling rate for a digital audio playback to 96 KHz, to initiate a file download, file copy or other operation, to operate user interface controls on device 106, or to perform other operations or processing as defined in extension set 122. In embodiments for example device 106 may be instructed via device instructions 108 to enter a special or alternate operating made, to execute those operations. Other configurations are possible.

In step 414, the device 106 may be returned to a non-extension or other mode as appropriate, for instance after a file transfer operation is completed or otherwise. In step 416, processing may return to a prior processing point, proceed to a further processing point, repeat or end.

The foregoing description of the invention is illustrative, and modifications in configuration and implementation will occur to persons skilled in the art. For instance, while the invention has generally been described in terms of communicating one set of device instructions 108 to or from a single device 106, in embodiments more than one set of device instructions 108 may be delivered to a single device 106, or in embodiments one or more set of device instructions 108 may be communicated to or from more than one device 106, such as a chain of devices or other arrangement. In further embodiments, rather than establish communication between a client 102 and device 106 via protocol 110 and extension set 122, in embodiments two or more devices 106 such as digital cameras, audio players, video recorders or other devices may also establish a communication link directly between themselves, using protocol 110 and extension set 122.

Similarly, while the invention has in embodiments been described as generally involving a data schema including a set of extension set names 116 as a field used to discriminate the extension set 122 of various hardware or software manufacturers or vendors, in embodiments other fields, flags, identifiers or other structures may be used to generate or identify an independent space in which protocol extensions may be defined. Similarly, while the independent space in which the set of extension names 116 are encoded has generally been described as a set of extension spaces 114, in embodiments those or other unique identifiers may be encoded or stored in other areas or portions of protocol 110. For example, the unique identifier for an extension set 122, whether a set of extension set names 116 or otherwise, may in embodiments be encoded in or associated with an unused, known safe or verified conflict-free portion of the protocol 110, or elsewhere. Further, while in embodiments the invention has generally been described in terms of delivery of an extension set 122 to one client 102, in embodiments the extension set 122 or more than one extension set 122 may be transmitted to multiple clients or other machines, for instance delivered to clients on a local area network, or otherwise. Other hardware, software or other resources described as singular may in embodiments be distributed, and similarly in embodiments resources described as distributed may be combined. The scope of the invention is accordingly intended to be limited only by the following claims.

We claim:

1. A system for initiating operations from an extension set to a protocol, comprising:
    a communications interface communicating with a device;
    an extension set, defined by a device manufacturer or vendor, extending operations of a transport protocol, the extension set being identified by a unique identifier corresponding to a previously registered domain name, wherein the device manufacturer or vender is able to define the extension set without reliance or intervention by a third party standards body or a human-reviewed organization; and
    a control module, the control module communicating with the communications interface and the extension set to control the device using the extended operations of the extension set.

2. A system according to claim 1, wherein the device comprises at least one of an audio player, an audio recorder, a video player, a video recorder, a personal digital assistant, a cellular telephone, a global positioning device, an event recording device, a portable storage device and a remotely controlled device.

3. A system according to claim 1, wherein the control module is hosted in a client.

4. A system according to claim 3, wherein the client comprises a computer.

5. A system according to claim 1, wherein the extension set comprises at least one of extended commands, extended operations and extended data fields.

6. A system according to claim 1, wherein the unique identifier comprises a Domain Name System domain name.

7. A system according to claim 1, wherein the unique identifier is encoded within an extension space of the transport protocol.

8. A system according to claim 7, wherein the extension space comprises a restricted extension space.

9. A system according to claim 1, wherein the unique identifier is encoded within an unused or known safe portion of the transport protocol.

10. A system according to claim 1, wherein the transport protocol comprises the Media Transport Protocol.

11. A system according to claim 1, wherein the extension set identified by the unique identifier automatically does not conflict with an extension set associated with another unique identifier.

12. A system according to claim 11, wherein the extension set is independently defined from the extension set associated with the other unique identifier.

13. A system according to claim 1, wherein the extension set is downloadable via a remote data store.

14. A device, the device being configured to execute operations from an extension set to a protocol, comprising:
    a communications interface to communicate with a client; and
    a processor, the processor communicating with the communications interface to initiate operations of an extension set to a transport protocol based on a unique identifier associated with the operations, wherein the unique identifier is a registered domain name and is associated with the device, wherein a device manufacturer or vender is able to define the extension set without reliance or intervention by a third party standards body or a human-reviewed organization.

15. A device according to claim 14, wherein the device comprises at least one of an audio player, an audio recorder, a video player, a video recorder, a personal digital assistant, a cellular telephone, a global positioning device, an event recording device, a portable storage device and a remotely controlled device.

16. A device according to claim 15, wherein the client comprises a computer.

17. A device according to claim 14, wherein the extension set comprises at least one of extended commands, extended operations and extended data fields.

18. A device according to claim 14, wherein the unique identifier comprises a Domain Name System domain name.

19. A device according to claim 14, wherein the unique identifier is encoded within an extension space of the transport protocol.

20. A device according to claim 14, wherein the transport protocol comprises the Media Transport Protocol.

21. A device according to claim 14, wherein the extension set identified by the unique identifier automatically does not conflict with an extension set associated with a unique identifier associated with another device.

22. A method for processing operations of an extension set to a protocol, comprising:
    communicating with a device;
    detecting an extension set implementation associated with the device;
    determining if there is more than one version of the extension set;
    based on the determination of whether there is more than one version of the extension set, determining a version identifier, wherein the version identifier specifies which version of the extension set is to be employed with the device;
    accessing the extension set, the extension set comprising extended operations of a transport protocol, the extension set being identified by a unique identifier associated with the extended operations, wherein the unique identifier uniquely identifies, by way of a registered domain name, one or more of a device manufacturer, a vendor, or a software developer associated with the device, wherein the device manufacturer or the vender is able to define the extension set without reliance or intervention by a third party standards body or a human-reviewed organization; and controlling the device using the extended operations of the extension set.

23. A method according to claim 22, wherein the device comprises at least one of an audio player, an audio recorder, a video player, a video recorder, a personal digital assistant, a cellular telephone, a global positioning device, an event recording device, a portable storage device and a remotely controlled device.

24. A method according to claim 22, wherein the controlling is executed in a client.

25. A method according to claim 24, wherein the client comprises a computer.

26. A method according to claim 22, wherein the extension set comprises at least one of extended commands, extended operations and extended data fields.

27. A method according to claim 22, wherein the unique identifier comprises a Domain Name System domain name.

28. A method according to claim 22, wherein the unique identifier is encoded within an extension space.

29. A method according to claim 28, wherein the extension space comprises a restricted extension space.

30. A method according to claim 22, wherein the unique identifier is encoded within an unused or known safe portion of the transport protocol.

31. A method according to claim 22, wherein the transport protocol comprises the Media Transport Protocol.

32. A method according to claim 22, wherein the extension set identified by the unique identifier automatically does not conflict with an extension set associated with another unique identifier.

33. A selectable extension set to a transport protocol, comprising:

a unique identifier field, the unique identifier field being associated with a device; and an extension set, the extension set extending the operations of a transport protocol in the device, the extension set being identified by a unique identifier associated with the extended operations, wherein the unique identifier is a registered domain name associated with one or more of a device manufacturer, a software developer, or a vendor, wherein the device manufacturer or the vender is able to define the extension set without reliance or intervention by a third party standards body or a human-reviewed organization.

34. A selectable extension set according to claim 33, wherein the device comprises at least one of an audio player, an audio recorder, a video player, a video recorder, a personal digital assistant, a cellular telephone, a global positioning device, an event recording device, a portable storage device and a remotely controlled device.

35. A selectable extension set according to claim 33, wherein the extension set is activated via a client.

36. A selectable extension set according to claim 35, wherein the client comprises a computer.

37. A selectable extension set according to claim 33, wherein the extension set comprises at least one of extended commands, extended operations and extended data fields.

38. A selectable extension set according to claim 33, wherein the unique identifier comprises a Domain Name System domain name.

39. A selectable extension set according to claim 33, wherein the unique identifier is encoded within an extension space.

40. A selectable extension set according to claim 39, wherein the extension space comprises a restricted extension space.

41. A selectable extension set according to claim 33, wherein the unique identifier is encoded within an unused or known safe portion of the transport protocol.

42. A selectable extension set according to claim 33, wherein the transport protocol comprises the Media Transport Protocol.

43. A selectable extension set according to claim 33, wherein the extension set identified by the unique identifier automatically does not conflict with an extension set associated with another unique identifier.

* * * * *